United States Patent [19]
John et al.

[11] Patent Number: 5,766,477
[45] Date of Patent: Jun. 16, 1998

[54] PROCESS FOR TREATING A LIQUID REACTIVE MEDIUM

[75] Inventors: Edmund Victor Owen John; George L. Kühn, both of Johannesburg, South Africa

[73] Assignee: African Oxygen Limited, Johannesburg, South Africa

[21] Appl. No.: 790,835

[22] Filed: Jan. 30, 1997

[30] Foreign Application Priority Data

Feb. 1, 1996 [ZA] South Africa .................. 96/0787

[51] Int. Cl.$^6$ .................................................. C02F 3/26
[52] U.S. Cl. .................... 210/627; 210/758; 210/765
[58] Field of Search ............................ 210/620, 627, 210/741, 749, 750, 757, 758, 743, 765

[56] References Cited

U.S. PATENT DOCUMENTS

| | | | |
|---|---|---|---|
| 4,152,409 | 5/1979 | Nagao et al. | 210/758 |
| 4,163,712 | 8/1979 | Smith | 210/627 |
| 4,548,765 | 10/1985 | Hultholm et al. | 210/758 |
| 5,362,405 | 11/1994 | Birbara et al. | 210/758 |
| 5,463,176 | 10/1995 | Eckert | 210/627 |
| 5,552,061 | 9/1996 | Smith et al. | 210/750 |

*Primary Examiner*—Thomas G. Wyse
*Attorney, Agent, or Firm*—R. Hain Swope; Salvatore P. Pace

[57] ABSTRACT

A process for the treatment of a liquid reactive medium with a gas comprising dispersing the gas in a liquid in which the gas is sparingly soluble to form a dispersion thereof, said liquid being maintained at a pressure (P1) greater than the pressure (P2) of the liquid reactive medium and the amount of said gas dispersed therein being in excess of its saturation point in the liquid; and introducing the dispersion into the liquid reactive medium having a demand for the gas which is in excess of the amount of gas capable of being dissolved therein at the prevailing conditions in the treatment zone.

10 Claims, 1 Drawing Sheet

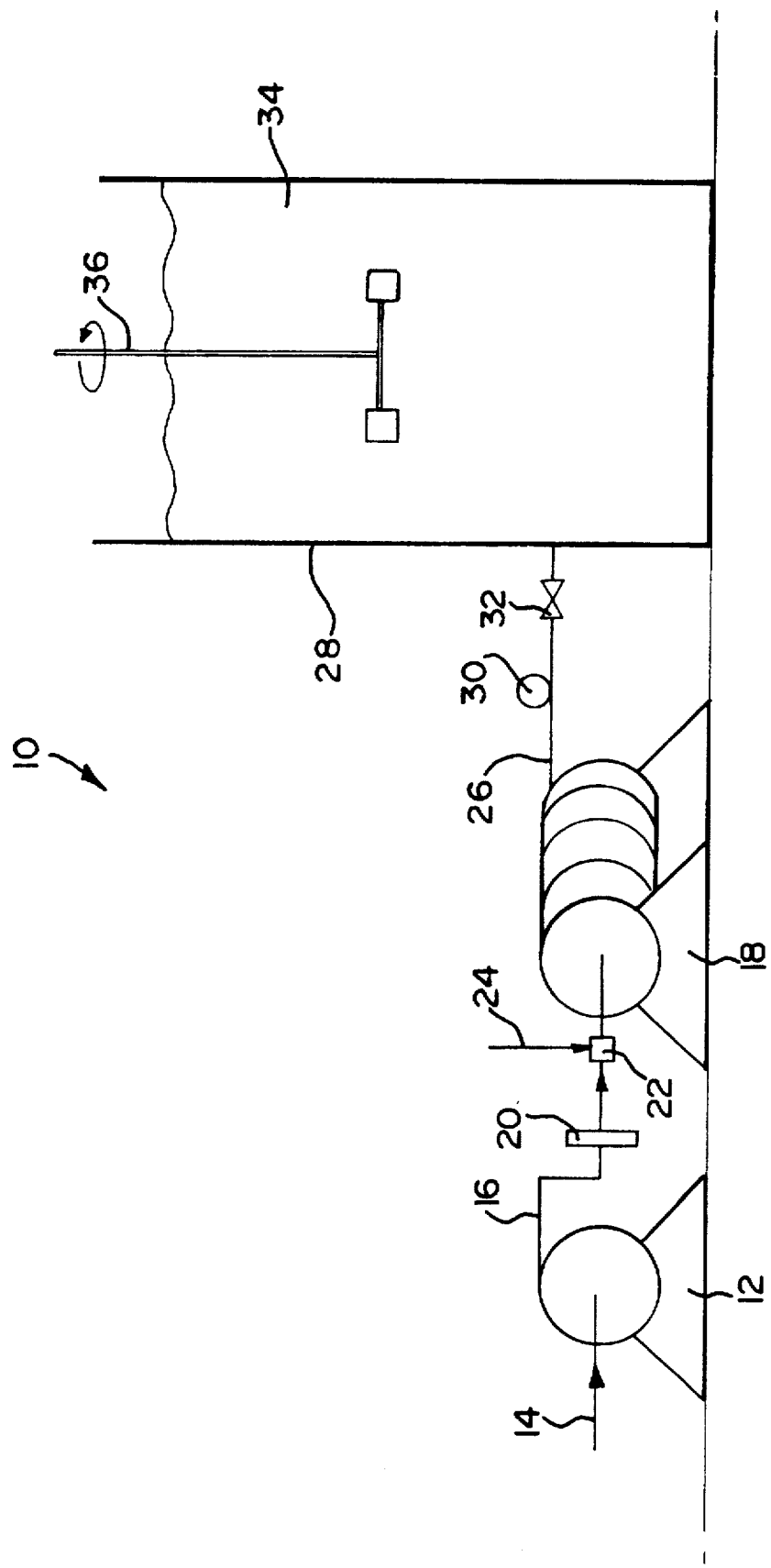

PROCESS FOR TREATING A LIQUID REACTIVE MEDIUM

BACKGROUND OF THE INVENTION

Various processes are known for dissolving a gas in a liquid reactive medium, such as water, for a number of uses. A problem typically encountered in such processes is that the dispersion of the gas in the liquid reactive medium is not even. In accordance with the present invention, there is provided a process for treating a liquid reactive medium by which a quantity of a sparingly soluble gas is evenly distributed into a liquid reactive medium so as to maximize its efficiency therein.

BRIEF SUMMARY OF THE INVENTION

The process of the present invention comprises dispersing a gas in a liquid in which the gas is sparingly soluble, so as to form a dispersion of bubbles of the gas in the liquid; introducing, in a treatment zone, the dispersion into a liquid reactive medium having a demand for that gas which is in excess of the amount of gas capable of being dissolved in the liquid reactive medium at the prevailing conditions in the reaction zone, thereby providing the liquid reactive medium with additional gas for meeting its demand therefor.

BRIEF SUMMARY OF THE DRAWING

The accompanying drawing is illustrative of the present invention, but is not intended to limit the invention as defined by the accompanying claims.

The FIGURE is a schematic view of an apparatus for carrying out the process of the invention.

DETAILED DESCRIPTION OF THE INVENTION

The process according to the invention enhances the efficiency of gas utilization in a liquid reactive medium. In particular, gas retention in the liquid reactive medium or reactant is increased and the gas becomes more accessible to reaction within the liquid reactive medium. This is due to the even dispersion of the gas and, hence, its increased retention time in the liquid reactive medium. It is believed that the reaction kinetics can thereby also be increased and the reaction time decreased, and that gas utilization in a reaction involving the gas can be improved thereby, for example, decreasing the amount of wasted gas.

The gas utilized in the subject process may be oxygen, oxygen-enriched air, air, carbon dioxide, or the like. While, at least in principle, the liquid can be any liquid in which a dispersion of the gas can form, practical considerations such as cost and availability dictate that it will normally be water which will be utilized hereinafter to illustrate the subject process.

The dispersion of the gas in the water may be effected by introducing, with mixing, the gas into the water while maintaining the water at a pressure (P1) greater than a pressure (P2) at which the liquid reactive medium is maintained, with a sufficient quantity of the gas being used to exceed its saturation point in water at the water pressure P1. The volumetric ratio of gas to water will thus be such that, upon introduction of the dispersion into the liquid reactive medium at the pressure P2, a finely dispersed condition, suitable for reaction, is obtained, without significant coalescence of the gas, which would result in excessive loss of the gas to atmosphere. The volumetric ratio, at standard temperature and pressure (STP), of the gas to water may thus be between 1:1 and 4:1, preferably between 1:1 and 3:1, while the pressure P1 may be from 3 to 50 atm.

It is believed that the introduction of a dispersion comprising oxygen to water in a volumetric ratio of 1:1 at STP and which dispersion is at any pressure P1, into a liquid reactive medium at P2 where P2<P1, will give a gas dispersion in the liquid reactive medium which is in micro bubble form. Furthermore, higher or lower ratios can, it is believed, be used, e.g. where larger bubbles in the liquid reactive medium can be handled suitably to give sufficient retention time of the bubbles therein for effective reaction, e.g. by mechanical agitation.

The resulting dispersion may thus be fed substantially continuously into the liquid reactive medium, with the gas also being dispersed substantially continuously into the water to form the dispersion. However, to maintain micro bubbles in the liquid reactive medium, gas, e.g. oxygen, flow or dispersion into the water can be interrupted from time to time while maintaining water feed into the liquid reactive medium, particularly where oxygen decay rates in the liquid reactive medium are not excessive.

The process may include continuously, or periodically, varying or adjusting the mass of gas introduced into the liquid reactive medium by means of the dispersion. This may be effected by varying P1 to achieve a variation in the mass ratio of gas to water in the dispersion, while keeping the volumetric ratio the same. The volumetric ratio may thus be determined by the acceptable bubble size, once the dispersion has been released into the liquid reactive medium.

The process may include holding the dispersion in a pressurized holding zone, e.g. in a pressurized storage tank, until required, i.e. prior to feeding it, e.g. by pumping, into the liquid reactive medium. The process may then include recycling, e.g. continuously, the dispersion to the holding zone to maintain the dispersion of the gas in the water. Thus, for example, the dispersion may continuously be recycled from the bottom of the storage tank to the top thereof.

It is believed that the process provides a means of evenly distributing the gas in the liquid reactive medium in the reaction zone. The liquid reactive medium may comprise a liquid reactant or mixture of liquid reactants undergoing reaction, or requiring pre-treatment with the gas prior to undergoing reaction. Thus, in one embodiment of the invention, the liquid reactive medium may comprise a mineral slurry, and the gas may be oxygen, oxygen-enriched air, or air, with the increased levels of available oxygen provided by the introduction of the dispersion into the slurry enhancing subsequent metal extraction from the mineral ore in the slurry.

In another embodiment of the invention, the liquid reactive medium may be wastewater or the like which is subjected to aerobic treatment in the treatment zone or in a reaction zone downstream of the treatment zone, and the gas may be oxygen, oxygen-enriched air, or air, with the increased levels of available oxygen provided by the introduction of the dispersion into the slurry enhancing aerobic treatment.

In a further embodiment of the invention, the liquid reactive medium can be water for recycling or reuse in a chemical process involving reaction with the gas, e.g. oxygen, such as a mineral extractive process, with the recycle or reuse water thus being pre-treated with the dispersion prior to being reused.

In yet a further embodiment of the invention, the liquid reactive medium may be a liquid that requires neutralization, with the gas then being carbon dioxide.

The forming of the dispersion may be affected by bleeding the gas into the water through a bubble forming device, e.g. a sinter bubbler, and thereafter intimately mixing the bubbles with the water to create a stable dispersion. The intimate mixing may be effected by passing the dispersion through a suitable mixer. In one embodiment, the mixer may be a multistage pump. In another embodiment, it may be a device as described in U.S. Pat. No. 4,664,680 the disclosure of which is incorporated herein by reference.

Turning to the FIGURE, a system 10 is generally illustrated for treating a liquid reactive medium in accordance with the process of the subject invention. The system 10 includes a pump 12 with a water conduit 14 leading into the suction side thereof. A discharge conduit 16 leads from the pump 12 to a multistage pump 18. The conduit 16 is provided with a liquid flow meter 20 and an in-line sinter bubbler 22.

An oxygen flow line 24 leads into the sinter bubbler 22. The conduit 24 leads from a pressurized oxygen supply, e.g. a oxygen cylinder or a vacuum insulated liquid evaporator, and is fitted with a flow meter (not shown), pressure gauge (not shown) and pressure regulator (not shown). A conduit 26 leads from the discharge of the pump 18 to a vessel 28. The conduit 26 is fitted with a pressure gauge 30 and a gate valve 32.

The vessel 28 contains a liquid reactive medium 34 having a demand for oxygen which is in excess of the amount of oxygen capable of being dissolved therein at the prevailing conditions in the vessel 28. Typically, the liquid reactive medium 34 is a slurry of mineral ore in water, and from which ore it is desired to extract a metal with the metal extraction being promoted by the presence of oxygen in a quantity in excess of the oxygen which is capable of being dissolved in the slurry. This excess is relative to the kinetic reaction rate of the reactants, i.e. the higher the rate, the quicker excess oxygen is consumed and therefore the lower the loss of oxygen. The vessel 28 is fitted with a stirrer 36.

In use, fresh or recycled water is fed along the conduit 14 into the pump 12 where it is pressurized to a suitable pressure, typically about 10 to 12 bar. The pressurized water than passes along the conduit 16 into the multistage pump 18. As it passes through the in-line sinter bubbler 22, oxygen flowing along the flow line 24 is introduced therein under pressure, with the oxygen pressure typically being 10.5 to 12.5 bar. The sinter bubbler 22 breaks up the oxygen into bubbles, thereby distributing the oxygen evenly throughout the body of water. The water then passes through the multistage pump or mixer 18 wherein a dispersion of micro bubbles of oxygen is formed, the bubble size being dependent upon the volume ratio of oxygen to water. The resultant dispersion may be at the same pressure or higher than the water from pump 12 depending on the number of stages of mixing being used. Typically, the pressure (P1) from the multistage pump or mixer 18 is 10 bar or higher.

The oxygen dispersion formed in the multistage pump or mixer 18 is fed along the flow line 26 into the slurry 34 in the vessel 28, with the slurry 34 being stirred continuously. This results in the formation of a stable oxygen dispersion within the slurry 34, with the dispersion being maintained by means of the agitation of the slurry. In this fashion, the oxygen bubbles in the dispersion are maintained more-or-less intact within the slurry 34, while the retention time of the bubbles in the slurry is thereby enhanced, giving increased reaction kinetics and decreased reaction time of the oxygen with the metal components in the ore making up the slurry. The volumetric ratio of oxygen introduced along the flow line 24 to water passing along the flow line 16 should preferably be in the region of 1:1 to 4:1 v/v oxygen to water (at 1 bar), and used at any given pressure, for good results.

It will be apparent from the following calculation that, at elevated pressure, for the same mass percentage of oxygen in water, a lower volumetric ratio of oxygen to water is obtained.

At 1 bar:

Volumetric proportion of oxygen to water is $1N$ $m^3$ oxygen in 1 $m^3$ water. Thus, the volumetric ratio of oxygen to water is 1:1, and the mass percentage in water is 0.132% oxygen.

At 12 bar:

Again the mass percentage of oxygen in water is 0.132% by mass oxygen. However, the volumetric ratio of oxygen to water is thus only 0.083:1, i.e. 0.083 $m^3$ oxygen in 1 $m^3$ water. Alternatively, 1 $m^3$ oxygen in 1 $m^3$ water at 12 bar is equivalent to 1.584% by mass oxygen in water.

The practical advantages of the subject process can be realized by considering the treatment of a slurry of gold bearing ore in water. Typically, such a slurry can consist of 1000 t of slurry water and 1388 t of ore, on a dry basis. In general, the oxygen demand for such an ore is 0.1 kg oxygen per ton of dry ore i.e. 138.8 kg oxygen per 1000 t slurry water, which is above the dissolved oxygen level in the slurry water. It is thus necessary to add additional oxygen to the slurry, and this has hitherto been effected by, for example, bubbling oxygen into the slurry, which is wasteful.

In accordance with the process of the present invention, the additional oxygen can be dispersed in water, with the dispersion then being added to the slurry to provide the additional oxygen. Typically, the additional oxygen can be dispersed in water at a level of 1:1 v/v for stable dispersion. At 1 bar, 138.8 kg oxygen is equivalent to 183.2 $Nm^3$ oxygen. 183.2 $Nm^3$ oxygen would thus be dispersed in 183.2 $m^3$ of water, and the resultant dilution, when the dispersion is introduced into the slurry, would be 183.2 $m^3$ dispersion water on 1000 $m^3$ slurry water. This thus results in excessive dilution of the slurry due to the volume of dispersion water used.

However, at 10 bar, the 183.2 $Nm^3$ of oxygen is reduced in volume to 18.3 $Nm^3$, and at 1:1 v/v for stable dispersion, is dispersed in 18.3 $m^3$ of water. The dilution is then only 18.3 $m^3$ dispersion water on 1000 $m^3$ slurry water. Thus, excessive dilution of the slurry is thereby avoided.

We claim:

1. A process for treating a liquid reactive medium with a gas comprising:

dispersing the gas in a liquid in which the gas is sparingly soluble, so as to form a dispersion comprising bubbles of the gas in the liquid, said liquid being maintained at a pressure (P1) greater than the pressure (P2) of the liquid reactive medium and the amount of said gas dispersed therein being in excess of its saturation point in the liquid; and introducing, in a treatment zone, the dispersion into a liquid reactive medium having a demand for the gas which is in excess of the amount of gas capable of being dissolved in the liquid reactive medium at the prevailing conditions in the treatment zone, thereby providing the liquid reactive medium with additional gas for meeting said demand.

2. A process in accordance with claim 1, wherein the gas is selected from the group consisting of oxygen, oxygen-enriched air, air, and carbon dioxide, and the liquid is water.

3. A process in accordance with claim 2, wherein the volumetric ratio of gas to water is such that, the introduction of the dispersion into the liquid reactive medium at the pressure P2 produces a finely dispersed condition without significant coalescence of the gas.

4. A process in accordance with claim 3, wherein the volumetric ratio, at STP, of the gas to water is between 1:1 and 4:1, and the pressure P1 is from 3 to 50 atm.

5. A process in accordance with claim 4, wherein the volumetric ratio, at STP, of the gas to water is between 1:1 and 3:1.

6. A process in accordance with claim 2, wherein the liquid reactive medium comprises a mineral slurry, and the gas is selected from the group of oxygen, oxygen-enriched air, and air.

7. A process in accordance with claim 2, wherein the liquid reactive medium is wastewater which is subjected to aerobic treatment in the treatment zone or in a reaction zone downstream of the treatment zone, and the gas is selected from the group consisting of oxygen, oxygen-enriched air, and air.

8. A process in accordance with claim 2, wherein the liquid reactive medium is water for recycling or reuse in a chemical process involving reaction with the gas, with the recycle or reuse water thus being treated with the dispersion prior to being reused.

9. A process in accordance with claim 2, wherein the liquid reactive medium is a liquid that requires neutralization, and the gas is carbon dioxide.

10. A process in accordance with claim 2, wherein the forming of the dispersion is effected by bleeding the gas into the water through a bubble forming device and thereafter intimately mixing the bubbles with the water to create a stable dispersion.

* * * * *